(12) United States Patent
Swanson

(10) Patent No.: US 10,870,954 B2
(45) Date of Patent: Dec. 22, 2020

(54) ASPHALT PAVING MIXTURES STORAGE SILO THERMAL BARRIER SYSTEM

(71) Applicant: Astec, Inc., Chattanooga, TN (US)

(72) Inventor: Malcolm L. Swanson, Chickamauga, GA (US)

(73) Assignee: Astec, Inc., Chattanooga, TN (US)

( * ) Notice: Subject to any disclaimer, the term of this patent is extended or adjusted under 35 U.S.C. 154(b) by 0 days.

(21) Appl. No.: 16/799,266

(22) Filed: Feb. 24, 2020

(65) Prior Publication Data

US 2020/0270822 A1    Aug. 27, 2020

Related U.S. Application Data

(60) Provisional application No. 62/809,840, filed on Feb. 25, 2019.

(51) Int. Cl.
*E04F 15/18* (2006.01)
*E01C 19/10* (2006.01)
*B65D 88/26* (2006.01)

(52) U.S. Cl.
CPC .......... *E01C 19/1009* (2013.01); *B65D 88/26* (2013.01)

(58) Field of Classification Search
CPC .................................................... E04F 15/18
USPC ..... 366/592.21, 592.26; 220/592.21, 592.26, 220/592.22
See application file for complete search history.

(56) References Cited

U.S. PATENT DOCUMENTS

| | | | | | |
|---|---|---|---|---|---|
| 1,175,237 | A | * | 3/1916 | Cavanaugh | B65D 88/32 454/173 |
| 1,956,356 | A | * | 4/1934 | Justheim | A47J 41/0055 220/592.21 |
| 2,266,134 | A | * | 12/1941 | Wachowitz | A01J 9/04 165/169 |
| 2,338,455 | A | * | 1/1944 | Petri | 220/592.16 |
| 2,614,856 | A | * | 10/1952 | Beyer | B60P 3/22 280/832 |
| 2,648,848 | A | * | 8/1953 | Wirkus | E03D 1/01 4/416 |
| 2,853,744 | A | * | 9/1958 | Wallace | B65D 90/023 52/261 |
| 3,723,231 | A | * | 3/1973 | Clay | E04B 1/76 428/86 |
| 4,662,137 | A | * | 5/1987 | Edgar | F25D 17/08 52/245 |
| 5,190,720 | A | * | 3/1993 | Hunsbedt | G21C 13/024 376/287 |
| 5,406,602 | A | * | 4/1995 | Hunsbedt | G21C 15/18 376/299 |
| 5,499,277 | A | * | 3/1996 | Hunsbedt | G21C 15/18 376/299 |

(Continued)

*Primary Examiner* — David L Sorkin
(74) *Attorney, Agent, or Firm* — Chambliss, Bahner & Stophel, P.C.; Stephen D. Adams

(57) ABSTRACT

A storage silo apparatus having a storage silo including a shell wall, a secondary wall spaced radially outwards from the shell wall, and a space having a first width formed between an outer surface of the shell wall and an inner surface of the secondary wall. An insulation layer located in the space is narrower than the space such that an air gap is formed within the space. The air gap is formed radially adjacent the insulation layer and is configured to resist heat transfer between the shell wall and the secondary wall.

17 Claims, 5 Drawing Sheets

(56) References Cited

U.S. PATENT DOCUMENTS

| | | | |
|---|---|---|---|
| 6,915,917 B2 * | 7/2005 | Watanabe | A47J 41/024 |
| | | | 215/12.1 |
| 7,384,181 B1 * | 6/2008 | Collette | E01C 19/1004 |
| | | | 366/147 |

* cited by examiner

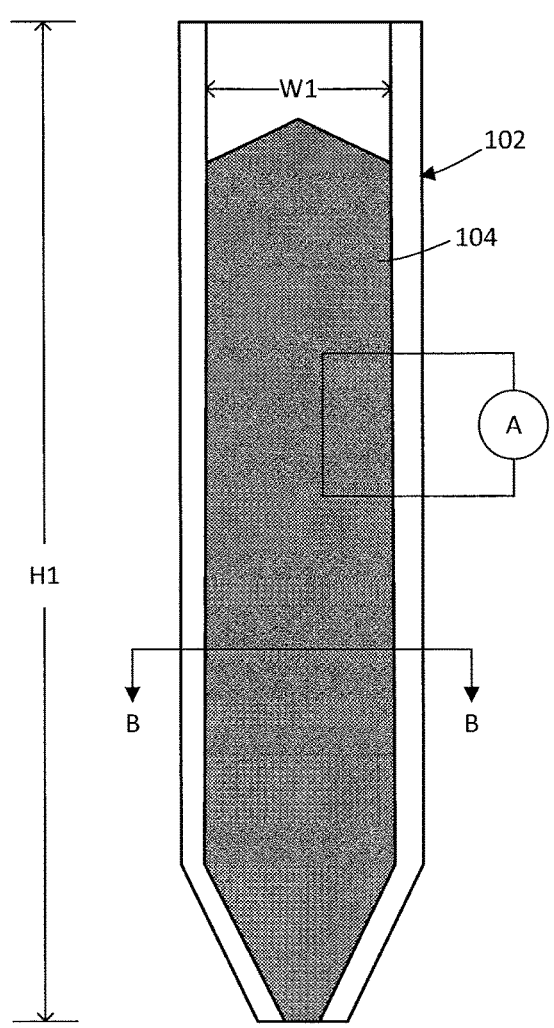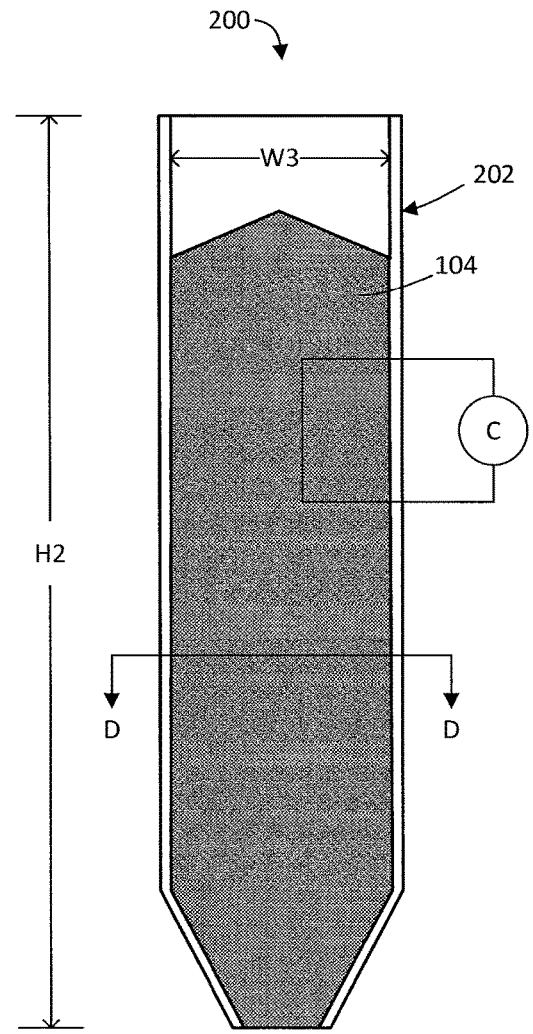
FIGURE 2
(Prior Art)
FIGURE 5

ASPHALT PAVING MIXTURES STORAGE SILO THERMAL BARRIER SYSTEM

CROSS-REFERENCE TO RELATED APPLICATION

This application claims the benefit of U.S. Provisional Patent Application No. 62/809,840, filed on Feb. 25, 2019 and entitled ASPHALT PAVING MIXTURES STORAGE SILO THERMAL BARRIER SYSTEM, which is incorporated herein by reference in its entirety.

TECHNICAL FIELD

The invention relates generally to asphalt storage silos. More particularly, the present invention relates to a storage silo having a combination air-insulation thermal barrier.

BACKGROUND OF THE INVENTION

Asphalt paving material production facilities often need to store finished product on site at the production plant or at a remote site until such time as the paving operations need the materials. With initial reference to FIGS. 1-4, there is provided a conventional storage silo assembly 100 having a thermally-insulated vertical silo 102 that is used in the storage of finished asphalt paving materials 104. The maximum internal storage capacity of the silo 102, which ranges from 50 tons to over 300 tons, is a function of the overall height H1 and internal diameter W1 of the silo. The storage period ranges from a few minutes to as much as several days. The paving material 104 is composed primarily of approximately 95% mineral aggregates, consisting of crushed rock and sand, and 5% liquid asphalt cement, and often includes performance enhancing additives. The liquid asphalt cement will remain in a fluid condition as long as the elevated temperature of mixture, usually somewhere between 250° F. and 325° F., is maintained. If the temperature of the mixture drops below this range, the liquid asphalt cement solidifies and prevents the paving material 104 from being discharged from the silo 102.

The temperature of the paving material 104 is maintained by the insulation system of the silo 102. Silo 102 is equipped with a conventional insulation system that includes a thick insulation layer 106 (shown in FIG. 3) that surrounds the exterior of the shell wall 108 of the silo. Conventional insulation layer 106 is often made from fiberglass or other similar materials, is typically provided in blanket or batt form, and is usually 5-6 inches thick extending continuously along the entire height H1 of the silo 102. A containment skin 110 is provided to maintain the integrity of insulation layer 106. This containment skin 110 is spaced radially outwards from shell wall 108 and forms an enclosed space 112 for housing the insulation layer 106. The containment skin 110 is generally formed as a backing for the insulation layer 106. Consequently, the containment skin 110 is spaced away from the shell wall 108 by a distance that is equivalent to the thickness of the insulation (i.e., about 5-6 inches) so as to define an outer diameter W2. Thus, conventional insulation systems are generally provided with insulation layer 106 that is sized to fill substantially the entire space 112 between the containment skin 110 and the shell wall 108.

Many conventional silos, such as silo 102, are susceptible to heat loss via several routes. First, radiant heat loss 114 occurs when heat from the asphalt paving material 104 located in the silo 102 radiates outwardly from the shell wall 108 and through the insulation layer 106 and containment skin 110. Next, convective heat loss occurs as airflows 116 pass over the containment skin 110 and carry heat away from the silo. Any heat loss from the silo 102 will tend to cool the paving material 104 disposed inside the silo and increases the energy needs and associated costs required to maintain the paving material at the desired temperature.

What is needed, therefore, is a silo having an improved insulation system that reduces radiant and convective heat loss from the silo.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

BRIEF SUMMARY OF THE INVENTION

The above and other needs are met by a storage silo apparatus having a storage silo having a cylindrically-shaped shell wall having a height, a secondary wall spaced radially outwards from the shell wall and surrounding the silo, and a space having a first width formed between an outer surface of the shell wall and an inner surface of the secondary wall. Insulation is located in the space between the secondary wall and the shell wall. The insulation has a second width that is smaller than the first width such that the difference between the first width of the space and the second width of the insulation forms an air gap within the space. The air gap is formed radially adjacent the insulation and is configured to resist heat transfer between the shell wall and the secondary wall. In a preferred embodiment, the air gap is located radially inwardly of the insulation layer in the space.

In certain embodiments, air dams are positioned along the height of the shell wall. The air dams divide the air gap into separate cylindrical ring-shaped enclosed air gap segments that are concentrically aligned and stacked on one another with an air gap located between them. The air dams disrupt airflow in the space traveling along the height of the shell wall from one air gap segment to an adjacent air gap segment. In certain embodiments, the air dams are formed using insulation.

In certain embodiments, supports are placed in the air gap. The supports preferably include an end that is configured to contact the insulation in order to position the insulation at a selected position between the outer surface of the shell wall and the inner surface of the secondary wall. Preferably, the supports are placed at circumferential intervals around the shell wall. In some embodiments, the end of each of the supports includes a flat section that contacts the insulation. In certain cases, the supports extend radially outwards from the shell wall through the air gap towards the secondary wall and position the insulation adjacent the secondary wall. In other cases, the supports extend radially inwardly from the secondary wall through the air gap towards the shell wall and position the insulation adjacent shell wall.

The insulation has an inner surface and an outer surface. In some embodiments, the insulation is placed into the space such that the inner surface of the insulation is adjacent the outer surface of the shell wall and the outer surface of the insulation is adjacent the air gap. In other embodiments, the insulation is placed into the space such that the outer surface of the insulation is adjacent the secondary wall and the inner surface of the insulation is adjacent the air gap. Preferably, the insulation is sized and configured to extend substantially continuously around a periphery of the shell wall.

In certain cases, the secondary wall has an inner surface configured to reflect radiation towards the shell wall. The inner surface may, for example, include a radiation reflective coating. Additionally or alternatively, the secondary wall itself may be formed from a radiation reflective material.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which:

FIG. 2 is a front elevation view that depicts an internal portion of a conventional silo;

FIG. 5 is a front elevation view that depicts an internal portion of a silo having a thermal barrier system according to an embodiment of the present invention;

DETAILED DESCRIPTION OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Referring now to FIG. 5, there is provided a storage silo apparatus 200 according to an embodiment of the present invention. Apparatus 200 includes a vertical storage silo 202 that may be used to store hot mix or warm mix asphalt paving material mixtures 104, at elevated temperatures, from the time the mix is produced at the production facility until such time as it is removed from the silo to be laid on the road surface. The maximum internal storage capacity of the silo 202 is a function of the overall height H2 and internal diameter W3 of the silo. Preferably, the maximum internal storage capacity of silo 202 is at least equivalent to that of silo 102 (shown in FIG. 2), ranging from 50 tons to over 300 tons. At the same time, the outer diameter W4 of silo 202 is preferably equal to the outer diameter W2 of silo 102. The height H2 of silo 202 is preferably less than height H1 of silo 102. As a result, silo 202 result can easily replace conventional silos, such as silo 102, with minimal or no site changes. Additionally, due to its smaller size (i.e., height), silo 202 is easier to transport and is easier and less costly to manufacture and maintain.

Figure 1:
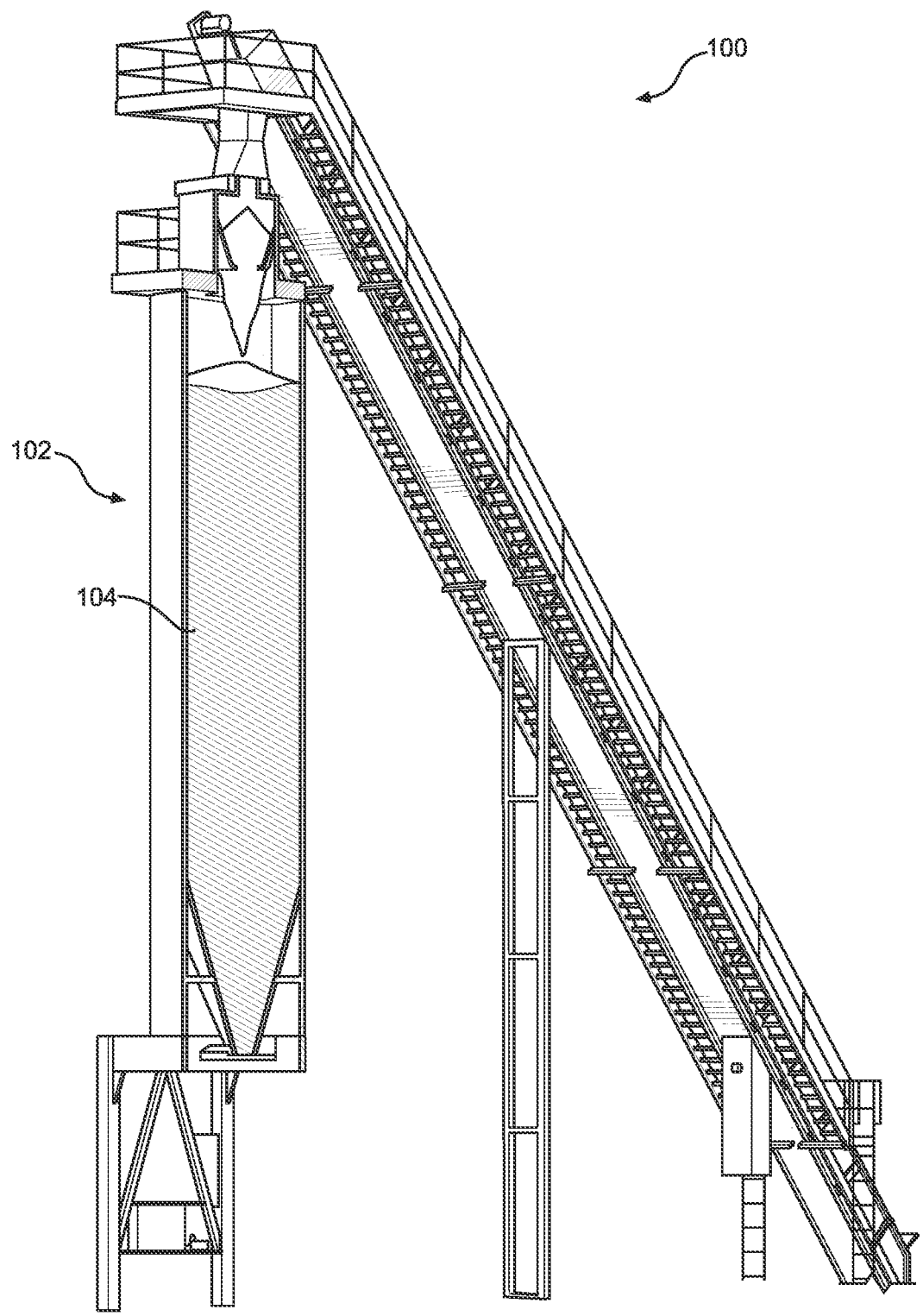
FIG. 1 is a front perspective view that depicts a conventional silo assembly, partially in section, that is commonly used in the long-term storage and dispensing of asphalt paving materials.
Figure 6:
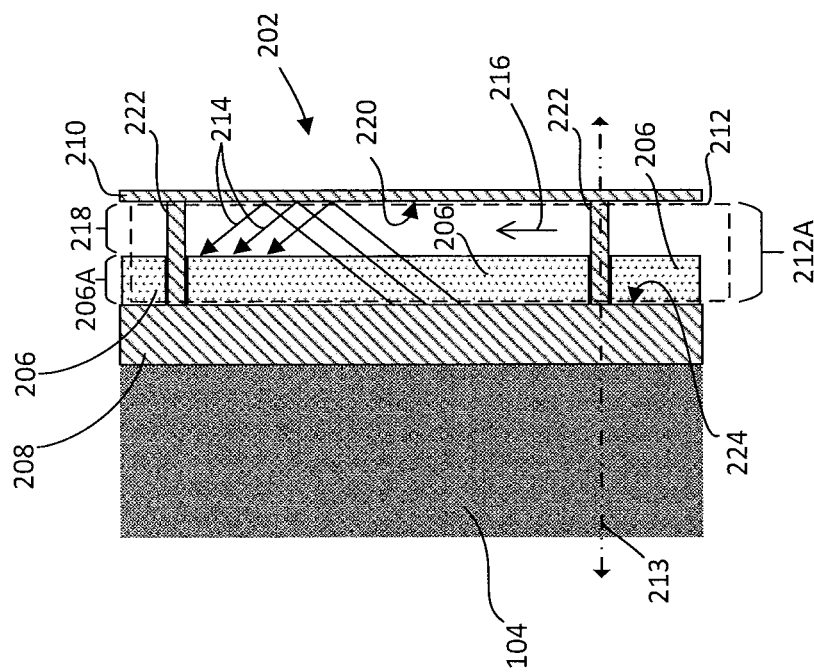
FIG. 6 is a detail view of area "C" of FIG. 5.
Figure 7:
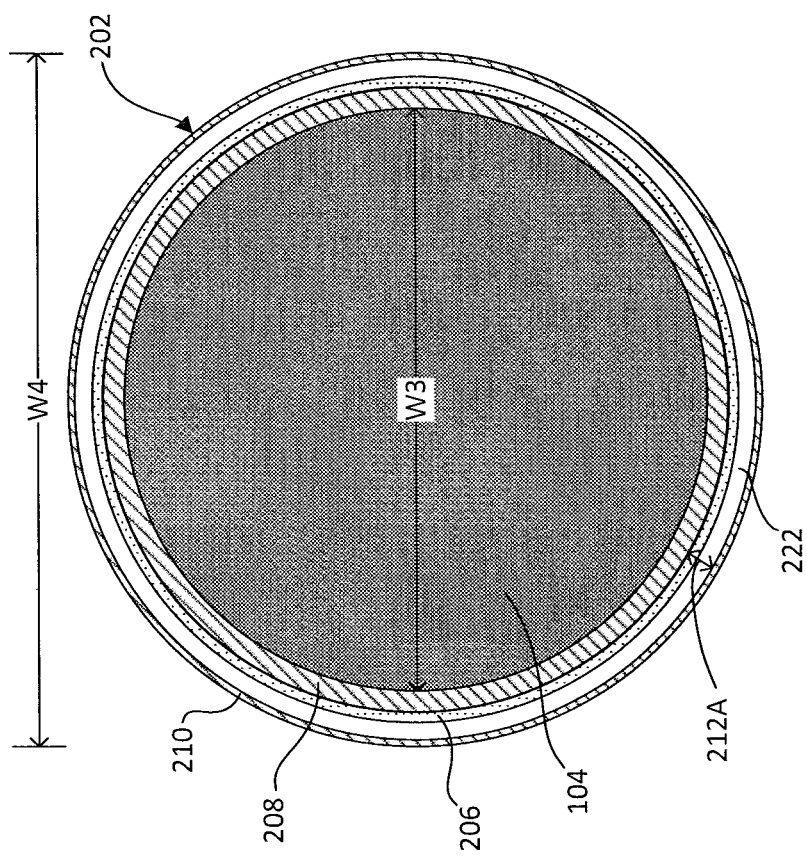
FIG. 7 is a cross-sectional view taken along line "D-D" of FIG. 5.

Referring now to FIGS. 6 and 7, in this particular embodiment, silo 202 has a cylindrically-shaped shell wall 208 and a secondary wall 210 that is spaced radially outwards from the shell wall and that surrounds the silo. However, apparatus 200 may be used in with silos having other shapes (e.g., octagonal, hexagonal, etc.). A space 212 (a portion of which is generally shown by dashed box in FIG. 6) is formed between the shell wall 208 and secondary wall 210 and extends around the entire silo 202. Space 212 has a first width 212A, which is measured along a radial line 213 extending from the center of the silo 202 through the shell wall 208 and secondary wall 210. As further discussed below, silo 202 is provided with an improved thermal barrier system that improves the heat retention of the silo 202 by reducing the escape of heat via radiation through the secondary wall 210 and by reducing convective heat transfer.

Preferably, the secondary wall 210 or at least an inner surface 220 thereof, has a high reflectivity characteristic for thermal radiation such that heat 214 radiating from an outer surface 224 of the shell wall 208 and away from the paving material 104 held within the silo 202 is reflected back towards the shell wall. For example, in some embodiments, the skin 210 or at least the inner surface 220 thereof is formed using a radiation reflective material, such as a metallic material (e.g., aluminum) or another highly radiation reflective material. Additionally or alternatively, a radiation reflective coating is applied to the inner surface 220 of the secondary wall 210. Preferably the material used for secondary wall 210 is partially or entirely recyclable material.

Figure 3:
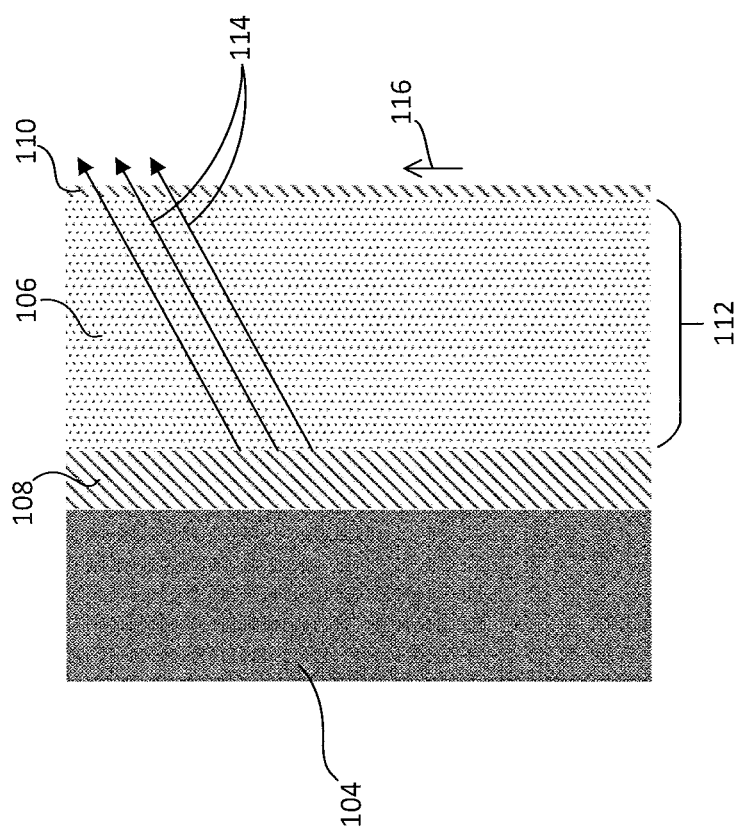
FIG. 3 is a detail view of area "A" of FIG. 2.

Next, an insulation layer 206 is located in the space 212 and surrounds an outer surface 224 of shell wall 208 of the silo 202. Preferably, the insulation layer 206 is sized and configured to extend substantially continuously around a periphery of the shell wall 208. Unlike conventional insulation systems, such as the system shown in FIG. 3, where insulation layer 106 fills substantially the entire enclosed space 112, insulation layer 206 is sized to only partially fill the enclosed space 212. Insulation layer 206 has a second width 206A that is smaller than the first width 212A, such that the difference between the first width of the space 212 and the second width of the insulation forms an air gap 218 within the space. The air gap 218 is radially adjacent the insulation layer 206 and is intended to resist heat transfer between the shell wall 208 and the secondary wall 210. However, the position of the air gap 218 within the space 212 may be changed, depending on the design needs of the system, to optimize heat retention, etc. Thus, in this particular case, the insulation layer 206 is positioned next to the shell wall 208 and the air gap 218 is located between the insulation and the secondary wall 210. However, in other embodiments, the insulation layer 206 may be positioned next to the secondary wall 210 and the air gap 218 may be located between the insulation and the shell wall 208.

The air gap 218 acts as a natural insulator for resisting conductive heat transfer and, when combined with insulation layer 206, adds significantly to the quality of the thermal barrier as compared to a thermal barrier comprised only of fiberglass insulation a conventional containment skin. In this particular embodiment, the space 212 has a first width 212A of 6 inches. In conventional thermal insulation systems, the insulation layer 106 would also be approximately 6 inches thick so that the insulation would fill the space and there would be no air gaps within the space. However, in this case, the insulation layer 206 has a thickness of approximately 1 inch, which leaves an air gap 218 of approximately 5 inches. Of course, the precise width of the insulation layer 206, space 212, and air gap 218 may vary depending on a number of factors, including the system requirements and the type of insulation being used. For example, in another embodiment, the insulation layer 206 may be approximately 5 inches wide and the air gap may be approximately 1 inch wide.

Insulation layer 206 is formed using materials such as fiberglass blankets or batts, ceramic wool blankets or batts, or sprayed-on foam insulation. These and other similar materials are typically difficult to recycle or reuse and, for that reason, are typically discarded (e.g., to a landfill) when a silo is at the end of its useful life. As shown above, the presently-disclosed thermal barrier system, used in silo 202, utilizes significantly less insulation in insulation layer 206 and is, therefore, more environmentally friendly than conventional thermal barrier systems that use a greater thickness of insulation in insulation layer 106 in silo 102 (shown in FIGS. 2 and 3).

Additionally, a series of air dams 222 are spaced along the height of the silo 102 for limiting airflows 216 within the air gap 218 and, more particularly, to limit air flow over the outer surface 224 of the shell wall 208 in order to reduce convective heat transfer. Air dams 222 are located within the enclosed space 212 encircling the shell wall 208 and divide air gap 218 into multiple cylindrical ring-shaped air gap segments, each preferably approximately 12 feet in height, that are stacked on one another along the height of shell wall 208. In this embodiment, a separate air gap 218 is formed between each of the air dams 222. The air dams 222 are designed to disrupt airflow 216 in the space 212 that might otherwise travel along the height of the shell wall 208.

In the embodiment shown in FIG. 6, each of the air dams 222 is connected continuously between the inside surface 220 of the secondary wall 210 and the outer surface 224 around the entire shell wall 208. Unlike silo 102, where insulation layer 106 extends continuously along the height H1, insulation layer 206 is formed into discrete segments between adjacent air dams 222. Since air dams 222 extend between the shell wall 208 and the secondary wall 210, it is important to prevent or limit conductive heat transfer through thermal bridging along the air dam. Accordingly, air dams 222 are preferably formed by an insulating material having a low thermal conductivity that will limit heat transfer from the shell wall 208 to the secondary wall 210. In an alternative embodiment, illustrated in FIGS. 8 and 9, air dams 222 are not connected between the secondary wall 210 and the shell wall 208. Air dams 222 may be connected to either the shell wall 208 or the secondary wall 210, if at all. The air dams 222 may be formed by any material that will disrupt airflows 216 within the space 212. For example, the air dams 222 shown in FIG. 6 may be formed from metal so that they may be welded between the shell wall 208 and the secondary wall 210. Alternatively, the air dams shown in FIG. 8 are formed from insulation.

Figure 8:
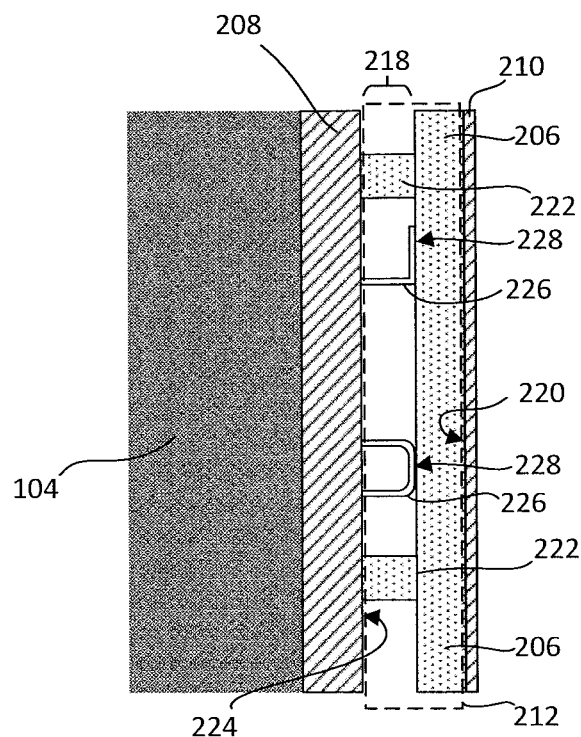
FIG. 8 is a detail view of an internal portion of a silo having a thermal barrier system according to an alternative embodiment of the present invention.
Figure 9:
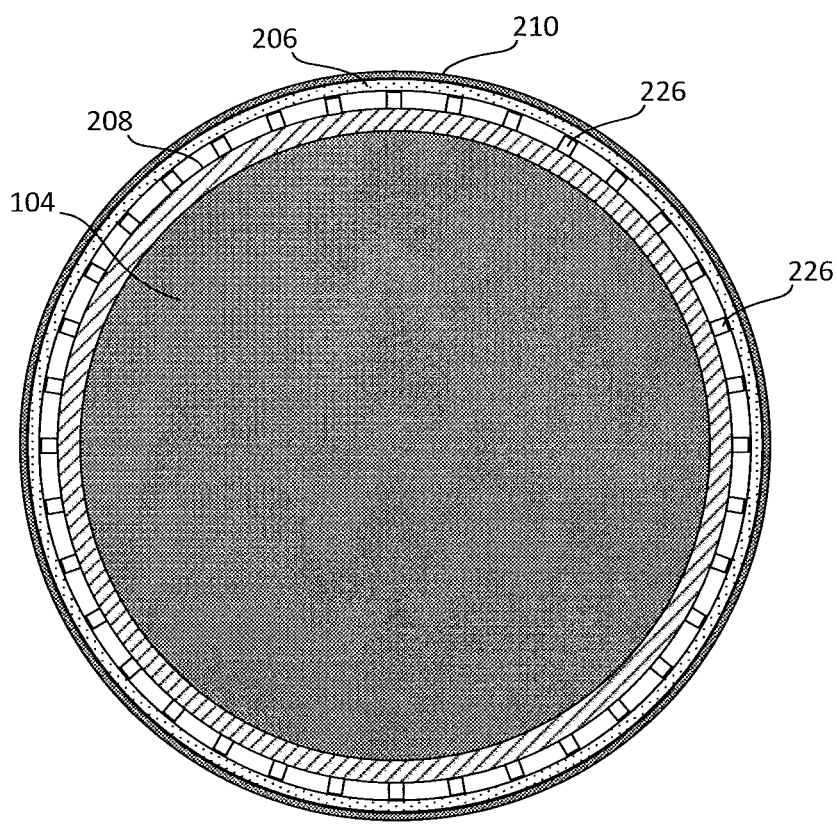
FIG. 9 is a cross-sectional view of the silo of FIG. 8.

With reference to FIGS. 6 and 8, the radial position or ordering of the insulation layer 206 and the air gap 218 within the space 212 along line 213 may be varied. In FIG. 6, the insulation layer 206 is positioned within the space 212 such that an inner surface of the insulation layer is adjacent the outer surface 224 of the shell wall 208 and an outer surface of the insulation layer is adjacent the air gap 218. On the other hand, in FIG. 8, the insulation layer 206 is positioned within the space 212 such that an outer surface of the insulation layer is adjacent the inner surface 220 of the secondary wall 210 and an inner surface of the insulation layer is adjacent the air gap 218. In still other embodiments, the insulation layer 206 may be positioned at an intermediate position between the two positions discussed above.

Certain embodiments of the present invention include a plurality of supports 226 that are disposed in the air gap 218 and have an end 228, which preferably includes a flat section, configured to contact the insulation layer 206 in order to maintain the insulation layer at a selected position between the outer surface of the shell wall 208 and the inner surface of the secondary wall 210. Two different types of supports 226 are shown in FIG. 8, including an "L" shaped version and a "U" shaped version. In both cases, connection ends of the supports 226 are preferably fixedly attached to the either the shell wall 208 or the secondary wall 210. For example, the supports 226 may extend radially inwards from the secondary wall 210 through the air gap 218 towards the shell wall 208 in order to position the insulation layer 206 adjacent the shell wall (or an intermediate position between the shell wall and secondary wall). In other cases, the supports 226 may extend radially outwards from the shell wall 208 through the air gap 218 towards the secondary wall 210 in order to position the insulation layer 206 adjacent the secondary wall (or an intermediate position between the shell wall and secondary wall). Preferably, several supports are located in each of the air gap segments between the air dams 222 at circumferential intervals to ensure the insulation layer 206 remains in the desired position within the space 212 around the shell wall 208.

Figure 4:
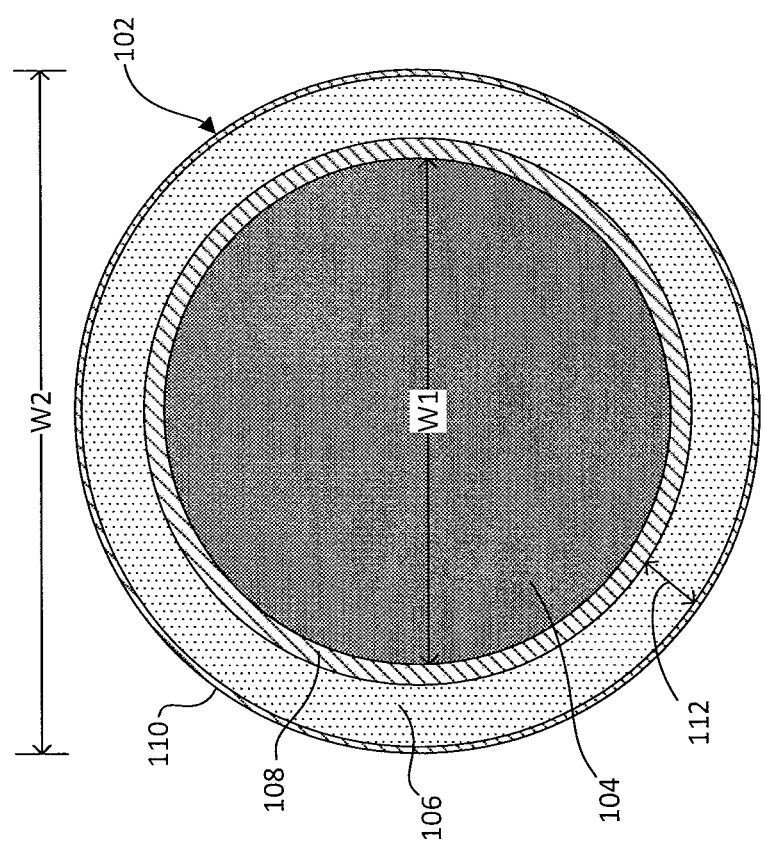
FIG. 4 is a cross-sectional view taken along line "B-B" of FIG. 2.

The insulation-air gap thermal barrier system disclosed herein contains heat much better than conventional insulation-only thermal barrier systems and the stored material 104 can be maintained in good, usable condition and temperature for a longer period of time and at a lower cost when compared to conventional systems. With reference to FIGS. 4 and 7, the thermal barrier system uses a thinner insulation layer 206 compared to conventional insulation layers 106. Reducing the thickness of insulation layer 206 allows for the internal diameter W3 to be increased while maintaining outer diameter W4 that is equal to the outer diameter W2 of conventional silos, such as silo 102. Increasing the internal diameter W3 allows for silo 202 to provide the same maximum internal capacity as silo 102 using a shorter silo (i.e., volume is equal and H1 is greater than H2, as can be seen by comparing FIGS. 2 and 5). Reducing the height of silo 202 makes transportation of the silo easier and also reduces the length of conveying devices that are required to transport paving materials 104 from the ground level to the top of the silo for storage. This, therefore, simplifies and reduces manufacturing and operational costs for silo 202 compared to conventional silo 102. The increased heat containment and decreased use of insulating materials reduces operating cost for silo 202, reduces fuel burning and associated emissions, and is better for the environment.

Although this description contains many specifics, these should not be construed as limiting the scope of the invention but as merely providing illustrations of some of the presently preferred embodiments thereof, as well as the best mode contemplated by the inventor of carrying out the invention. The invention, as described and claimed herein, is susceptible to various modifications and adaptations as would be appreciated by those having ordinary skill in the art to which the invention relates.

What is claimed is:

1. A storage silo apparatus comprising:
    a storage silo having a cylindrically-shaped shell wall having a height and configured to hold heated asphalt paving material and to be sealed to retain heat within the storage silo;
    a secondary wall spaced radially outwards from the shell wall and surrounding the silo;
    a space having a first width and that is configured to retain heat, the space formed between an outer surface of the shell wall and an inner surface of the secondary wall;
    an insulation layer disposed in the space between the secondary wall and the shell wall, the insulation layer having a second width that is smaller than the first width such that the difference between the first width of the space and the second width of the insulation layer forms a continuous air gap within the space encircling the shell wall of the storage silo, wherein the air gap is formed radially adjacent the insulation layer and is configured to resist heat transfer between the shell wall and the secondary wall; and
    a plurality of air dams located in the air gap in a spaced apart arrangement dividing the air gap into two or more ring-shaped air gap segments having top and bottom ends that are defined by a pair of adjacent air dams.
2. The apparatus of claim 1 wherein the air gap segments are concentrically aligned with one another along the height of of the shell wall and are stacked on one another and substantially prevent airflow from traveling from one air gap segment to an adjacent air gap segment.
3. The apparatus of claim 1 wherein the air dams are formed using insulation.
4. The apparatus of claim 1 wherein the insulation layer has an inner surface and an outer surface and wherein the insulation layer is configured for placement in the space such that the inner surface of the insulation layer is adjacent the outer surface of the shell wall and the outer surface of the insulation layer is adjacent the air gap.
5. The apparatus of claim 1 wherein the insulation layer has an inner surface and an outer surface and wherein the insulation layer is configured for placement in the space such that the outer surface of the insulation layer is adjacent the secondary wall and the inner surface of the insulation layer is adjacent the air gap.
6. The apparatus of claim 1 wherein the insulation layer is sized and configured to extend substantially continuously around a periphery of the shell wall.
7. The apparatus of claim 1 wherein the secondary wall has an inner surface configured to reflect radiation towards the shell wall.
8. The apparatus of claim 7 further comprising a radiation reflective coating provided on the inner surface of the secondary wall.
9. The apparatus of claim 7 wherein the secondary wall comprises a radiation reflective material.
10. The storage silo of claim 1 wherein each of the air dams is connected continuously between the outer surface of the shell wall and the inner surface of the second wall.
11. The storage silo of claim 1 wherein the secondary wall is cylindrically-shaped.
12. A storage silo apparatus comprising:
    a storage silo having a cylindrically-shaped shell wall having a height and configured to hold heated asphalt paving material and to be sealed to retain heat within the storage silo;
    a secondary wall spaced radially outwards from the shell wall and surrounding the silo;
    a space having a first width and that is configured to retain heat, the space formed between an outer surface of the shell wall and an inner surface of the secondary wall;
    an insulation layer disposed in the space between the secondary wall and the shell wall, the insulation layer having a second width that is smaller than the first width such that the difference between the first width of the space and the second width of the insulation layer forms a continuous air gap within the space encircling the shell wall of the storage silo, wherein the air gap is formed radially adjacent the insulation layer and is configured to resist heat transfer between the shell wall and the secondary wall; and
    a plurality of supports disposed in the air gap and having an end configured to contact the insulation layer in order to maintain the insulation layer at a selected position between the outer surface of the shell wall and the inner surface of the secondary wall.
13. The apparatus of claim 12 wherein the end of each of the plurality of supports comprises a flat section that contacts the insulation layer.
14. The apparatus of claim 12 wherein supports extend radially outwards from the shell wall through the air gap towards the secondary wall and position the insulation layer adjacent the secondary wall.
15. The apparatus of claim 12 wherein supports extend radially inwards from the secondary wall through the air gap towards the shell wall and position the insulation layer adjacent the shell wall.

16. The apparatus of claim 12 wherein the plurality of supports are disposed at circumferential intervals around the shell wall.

17. The apparatus of claim 12 further comprising a plurality of air dams located in the air gap in a spaced apart arrangement dividing the air gap into two or more ring-shaped air gap segments having top and bottom ends that are defined by a pair of adjacent air dams.

\* \* \* \* \*